US006933093B1

(12) United States Patent
Arias et al.

(10) Patent No.: US 6,933,093 B1
(45) Date of Patent: Aug. 23, 2005

(54) RADIATION SENSITIVE COATING COMPOSITION USEFUL FOR LITHOGRAPHIC PRINTING PLATES AND THE LIKE

(75) Inventors: Andre Luiz Arias, Rio de Janeiro (BR); Luiz Nei Arias, Rio de Janeiro (BR); Marjorie Arias, Rio de Janeiro (BR); Mario Italo Provenzano, Rio de Janeiro (BR)

(73) Assignee: IBF Industria Brasileira De Filmes S/A, Rio de Janeiro (BR)

( * ) Notice: Subject to any disclaimer, the term of this patent is extended or adjusted under 35 U.S.C. 154(b) by 0 days.

(21) Appl. No.: 09/787,667

(22) PCT Filed: Sep. 21, 1999

(86) PCT No.: PCT/BR99/00079

§ 371 (c)(1),
(2), (4) Date: Jun. 19, 2001

(87) PCT Pub. No.: WO00/17711

PCT Pub. Date: Mar. 30, 2000

(30) Foreign Application Priority Data

Sep. 21, 1998 (BR) .................................... 9803946
Apr. 19, 1999 (BR) .................................... 9901906

(51) Int. Cl.$^7$ ............................................ G03F 7/004
(52) U.S. Cl. ............................. 430/270.1; 430/281.1; 430/271.1; 430/176; 430/300; 430/302; 430/330; 101/327; 101/433; 101/457; 101/462
(58) Field of Search ...................... 430/270.1, 271.1, 430/281.1, 176, 300, 302, 309, 327, 330; 101/433, 457, 462, 327

(56) References Cited

U.S. PATENT DOCUMENTS

| | | | |
|---|---|---|---|
| 4,943,511 A * | 7/1990 | Lazarus et al. ............... 430/192 |
| 5,529,869 A | 6/1996 | Nguyen ........................ 430/78 |
| 5,601,961 A | 2/1997 | Nakayama et al. .......... 430/192 |
| 5,724,463 A | 3/1998 | Deacon et al. ............... 385/27 |
| 5,773,171 A | 6/1998 | Lee et al. ....................... 430/5 |
| 5,786,125 A * | 7/1998 | Tsuchiya et al. .......... 430/272.1 |
| 5,804,355 A | 9/1998 | Bosschaerts et al. ......... 430/346 |
| 5,814,430 A | 9/1998 | Daems et al. ................ 430/200 |
| 5,852,688 A | 12/1998 | Brinkman et al. ............. 385/16 |
| 5,879,861 A | 3/1999 | Van Damme et al. ....... 430/302 |
| 5,886,101 A | 3/1999 | Sommerfeld et al. ........ 525/112 |
| 5,916,734 A | 6/1999 | Takagami et al. ............ 430/302 |
| 5,919,601 A * | 7/1999 | Nguyen et al. ........... 430/278.1 |
| 5,932,394 A | 8/1999 | Van Hunsel et al. ......... 430/302 |
| 5,948,596 A | 9/1999 | Zhong et al. ................ 430/278 |
| 6,014,929 A | 1/2000 | Teng ............................ 101/456 |
| 6,022,667 A | 2/2000 | Vermeersch et al. ...... 430/271.1 |
| 6,042,987 A * | 3/2000 | Kobayashi ................ 430/270.1 |
| 6,562,527 B2 * | 5/2003 | Ray et al. ...................... 430/18 |

FOREIGN PATENT DOCUMENTS

EP 0 501 433 9/1992

OTHER PUBLICATIONS

Konica Corp. brochure (single page) on Konica CTP System Konica Thermal Plate, Public Date Not Indicated (appears to have code "97C8TE" but copy image not clear.
Thermostar brochure, "The plate for thermal imaging", Published by Afga-Gevaert AG (Jun. 1997).
DiamondPlate, Thermal Laser Plate brochure of Western Lithotech and Mitsubishi Chemical Co. (Aug. 1997).
Product Overview and Systems Solutions brochure of Anitec and International Paper Imaging Products Division (1997).
Digital Plates by Polychrome, "A Solution for Every Application . . . A Plate for Every Platesetter" brochure of Polychrome a division of Sun Chemical Corporation (1997).
Thermal Computer To Plate, Anitec, International Paper Imaging Products Division brochure (Aug. 1997).
Ozasol brochure of Afga-Gevert AG for N90A offset Laser Plate (May 1999).

* cited by examiner

*Primary Examiner*—Yvette C. Thornton
(74) *Attorney, Agent, or Firm*—Smith, Gambrell & Russell LLP

(57) ABSTRACT

The invention relates to a composition, which is primarily energy sensitive in the near infrared and infrared region, and which comprises a dual polymer system, an infrared absorbing material that absorbs at the desired wavelength, an acid generating compound, and, optionally, an acid stabilizing compound. The composition may be applied to the proper substrate and is useful to provide offset lithographic printing plates, color proofing film or photoresist.

15 Claims, No Drawings

RADIATION SENSITIVE COATING COMPOSITION USEFUL FOR LITHOGRAPHIC PRINTING PLATES AND THE LIKE

FIELD OF THE INVENTION

The invention relates to new radiation sensitive compositions, suitable for coating substrates, particularly lithographic printing plates, color proofing films or photoresist.

BACKGROUND OF THE ART

Compositions used in heat sensitive lithographic printing plates are well known in the art.

Compositions for coating lithographic plates comprising a phenolic resin-developer complex and a compound forming a complex with the phenolic resin were taught in the art.

It is an object of the present invention to provide new radiation sensitive compositions, specially suitable for use on printing plates, color proofing films and photoresist.

It is another object of the present invention the products manufactured with the use of radiation sensitive compositions of the present invention.

It is another object of the present invention to provide a process for manufacturing offset lithographic printing plates, color proofing films and related products using the new compositions of the present invention.

It still refers to said compositions for preparing the products mentioned herein.

SUMMARY OF THE INVENTION

The novel radiation sensitive composition is comprised of: 1) a dual polymer binder system, 2) an infrared absorbing compound, 3) an acid generating compound and, optionally, 4) a stabilizing acid.

DETAILED DESCRIPTION OF THE INVENTION

The radiation sensitive compositions of the present invention for coating substrates comprise 1) a dual polymer binder system, 2) an infrared absorbing compound, 3) an acid generating compound, and, optionally, 4) a stabilizing acid.

1. Dual Polymer Binder System

The first polymer of the binder system is a condensation product of phenol, o-chlorophenol, o-, m- or p-cresol, p-hydroxy benzoic acid. 2-naphthol or other monohydroxy aromatic monomer with an aldehyde such as formaldehyde, acetaldehyde, fural, benzaldehyde, or any other aliphatic or aromatic aldehyde. This polymer is preferred to have a molecular weight in the range from 2,000 to 80,000, more preferably in the range from 4,000 to 40,000, and most preferably in the range from 7,000 to 20,000.

The second polymer of the system is the condensation product of catechol, resorcinol, hydroquinone, bisphenol A, bisphenol B, trihydroxybenzene, or other di- or polyhydroxy aromatic compound, and methylolated analogs thereof, with an aldehyde such as formaldehyde, acetaldehyde, fural, benzaldehyde, or any other aliphatic or aromatic aldehyde. This polymer is preferred to have a molecular weight in the range from 150 to 15,000, more preferably in the range from 400 to 10,000, and most preferably in the range from 600 to 4,000.

2. Infrared Absorbing Compound

The infrared absorber may be either a dye or insoluble material such as carbon black. Preferred dyes are those derived from classes that include, but not limited to pyridyl, quinolinyl, benzoxazolyl, thiazolyl, benzothiazolyl, oxazolyl and selenazolyl. Carbon black is useful in that it is a panchromatic absorber and functions well with energy sources in the full spectrum of infrared useful for the application of imaging coating films, and is inexpensive and readily available. This region begins in the near infrared (NIR) at 750 nm and goes up to 1200 nm. The disadvantage of carbon black is the inability to participate in image differentiation. Dyes, in comparison, are just beginning to arise as commercial products, and are very expensive. They must be carefully selected so that the absorption λmax (lambda maximum) is closely matched with the output wavelength of the laser used on the image setter. Dyes will advantageously enhance the differentiation between the image and non-image areas created when the laser images in the medium being employed.

3. Acid Generating Compound

The acid generating compound is advantageously selected from the various onium salt classes. These include, but are not limited to sulfonium, sulfoxonium, arsonium, iodonium, diazonium, bromonium, selenonium and phosphonium. Generally, any compound capable of liberating a strong inorganic acid upon the onium salt being decomposed by heat, will be functional in this composition. The anion, which determines the released free acid, includes, but is not limited to chloride, bisulfate, hexafluoroantimonate, hexafluorophosphate, tetrafluoroborate, methane sulfonate and mesitylene sulfonate. More specific examples include diphenyliodonium hexafluorophosphate, 3-methoxy-4-diazodiphenylamine hexafluoro-phosphate.

4. Stabilizing Acid

The optional stabilizing acid compound is added to enhance the shelf life of the coated medium prior to being imaged. Carboxylic acids are preferred. More preferred are aromatic acids. Examples of such acids are benzoic acid and substitutes thereof and naphthoic acid and substitutes thereof.

The coating composition is dissolved in a suitable solvent(s). Examples of such solvents include, but are not limited to: 1-methoxy-2-ethanol, 1-methoxy-2-propanol, acetone, methyl ethyl ketone, diisobutyl ketone, methyl isobutyl ketone, n-propanol, isopropanol, tetrahydrofuran, butyrolactone, and methyl lactate.

The coating components may be added to various solid levels based upon the technique used to apply the coating to the substrate being coated. Therefore, the ratios of components may be the same, but the percentages could differ. The percentage ranges inherent to the amounts of each of the coating components will therefore be described herein as a percentage of the total solids.

This composition may be applied to different substrates for different purposes. Essentially, it can be used for manufacturing lithographic printing plates and in color proofing films or photoresist.

If applied to a textured and anodized aluminum surface, the coated product may be used as a lithographic or offset printing plate. If the composition is applied to a support, e.g. a polyester support, it may be advantageously used as a color proofing film.

When used for the manufacture of a printing plate, the composition is primarily sensitive to energy in the infrared (IR) region. There is essentially no sensitivity in the visible region of the spectrum. However, depending upon the specific infrared absorber selected, the composition may be made to respond in the ultraviolet region (UV). This would afford the additional advantage of being both IR and UV sensitive.

As to the processing of printing plates, the printing plates are preferably placed on an image setter for radiation and imaging. Such image setters may output at any wavelength. Presently there are two common wavelengths used. An array of laser diodes emitting at 830 nm is commercially available. Such a device is manufactured and sold by Creo, Vancouver, Canada. A YAG laser outputting at 1064 nm, manufactured and sold by Gerber, a division of Barco, Gent, Belgium, is also in the market. Each wavelength has its own advantages and disadvantages. Both, however, are capable of producing acceptcapable images according to the specific manufacturing mode or way used. Digitized information is then used for modulating the laser output.

The energy is directed to the plate surface where an energy transfer mechanism occurs. In the coating, the laser dye or infrared absorbing medium absorbs the energy emitted by the laser and releases that energy as heat. Such heat in turn causes the degradation of the acid generator held within the coating, which results in the release of a strong acid. Such acid in turn causes a reaction to occur between the polymers. The reaction may be a photo-hardening reaction that makes this a "write-the-image" approach. In such a process, the area struck with energy becomes the image while the remainder of the coating is removed in the developing process. On the other hand, if the reaction causes a photo-solubilization, it is a so-called "write-the-background" approach. Here the portion of the coating struck with energy is removed in the developing process, and the unaffected area becomes the image.

Depending upon the wavelength used for imaging, and the specific composition, the energy provided by the laser may be sufficient to adequately initiate the reaction and take it to completion. In instances when the energy is not sufficient, additional energy is required, which is typically applied in the form of a pre-heating step. Pre-heating may be accomplished by running the plate through an oven after being imaged and prior to being developed. The temperature is typically in the range from 800 to 150° C. A most common temperature is about 110° C. The time required at said temperature is usually between 30 and 200 seconds, more commonly about 1 minute.

By adjusting the formulation, it is also possible to use the heating step to cause the image to reverse. For instance, a plate imaged in the "write-the-background" mode would be expected to have the coating removed from the background when processed, as would be expected from the processing of a positive plate. When heated, it is possible to cause the image to reverse, such that the area exposed to laser radiation and now heated becomes the image. Therefore, the portion of the coating exposed to laser radiation becomes the image when heated, and that portion of the coating not exposed to laser radiation becomes the soluble upon development. The ability to cause this reversal is determined by the ratio of the two polymers used.

All coating compositions described herein are developed using a developer composition, which is usually completely aqueous and has a high pH. Developers typically used for positive plates are most useful. The developer takes advantage of the differentiation created with the exposure to remove the background coating and allow the image to remain. At this point the image is capable of some performance on printing machine, particularly if the required number of impressions is low. For performance enhancing, the coating may be baked. The baking step completes the cross-linking of the polymers and results in an image capable of providing several thousand times more images than without baking. The temperature range is from about 180° to 260° C. Most commonly 230° C. is used. The time in this step usually ranges from 1 to 10 minutes. Most commonly 4–5 minutes is used. Baking is usually performed within a conveyor oven such as those sold by Wisconsin Oven.

Typical compositions within the scope of the invention are as follows:

1. Write-the-background mode dual polymer binder,

| | |
|---|---|
| polyphenolic | 50–95% |
| polyhydric | 5.0–40% |
| infrared absorber | 0.1–12% |
| acid generator | 0.1–12% |
| stabilizing acid (optional) | 0.1–10% |

2. Write-the-image mode dual polymer binder,

| | |
|---|---|
| polyphenolic | 5–95% |
| polyhydric | 10–90% |
| infrared absorber | 0.1–12% |
| acid generator | 0.1–15% |
| stabilizing acid (optional) | 0.1–10% |

| | COMPOSITION A | COMPOSITION B |
|---|---|---|
| More particular compositions in the scope of the present invention include: | | |

1A. Write-the-background mode dual polymer binder,

| | | |
|---|---|---|
| polyphenolic | 50–90% | 60–95% |
| polyhydric | 5–35% | 10–40% |
| infrared absorber | 0.5–12% | 0.1–10% |
| acid generator | 0.5–12% | 0.1–10% |
| stabilizing acid | 0.1–10% | 0.1–10% |

| | COMPOSITION A' | COMPOSITION B' |
|---|---|---|

2A. Write-the-image mode dual polymer binder,

| | | |
|---|---|---|
| polyphenolic | 5–40% | 60–95% |
| polyhydric | 40–90% | 10–40% |
| infrared absorber | 0.5–12% | 0.1–10% |
| acid generator | 1.0–15% | 0.1–10% |
| stabilizing acid | 0.1–10% | |

For the "write-the-background" approach, according to a more specific and particular embodiment of the invention, the polyphenolic polymer (first polymer) is preferably used in the range from about 50% to about 90%, more preferably from about 55% to about 80% and most preferably from about 60% to about 75%. The polyhydric polymer (second polymer) is preferably used in the range from about 5% to about 35%, more preferably from about 8% to about 25%, and most preferably from about 10% to about 18%. The infrared absorbing compound is preferably used in the range from about 0.5% to about 12%, more preferably from about 1% to about 10%, and most preferably from about 2% to about 7%. The photoacid generating compound is preferably used in the range from about 0.5% to about 12%, more preferably from about 1% to about 10%, and most preferably from about 2% to about 7%. The stabilizing acid (optional component) is preferably used in the range from about 0.1% to about 10%, more preferably from about 0.5% to about 7%, and most preferably from about 1% to about 5%.

For the "write-the-image" approach, according to a more specific and particular embodiment of the invention, the polyphenolic polymer (first polymer) is preferably used in the range from about 5% to about 40%, more preferably from about 10% to about 35%, and most preferably from about 15% to about 30%. The polyhydric polymer (second polymer) is preferably used in the range from about 40% to about 90%, more preferably from about 45% to about 80%, and most preferably from about 50% to about 70%. The infrared absorbing compound is preferably used in the range from about 0.5% to about 12%, more preferably from about 1% to about 10%, and most preferably from about 2% to about 7%. The photoacid generating compound is preferably used in the range from about 1% to about 15%, more preferably from about 2% to about 12%, and most preferably from about 4% to about 10%. The stabilizing acid compound (optional component) is preferably used in the range from about 0.1% to about 10%, more preferably from about 0.5% to about 7%, and most preferably from about 1% to about 5%.

The coating components are dissolved in the desired solvent system. The coating solution is applied to the substrate of choice. The coating is applied so as to have a dry coating weight in the range from about 1.5 g/m$^2$ to about 3.0 g/m$^2$, more preferably from about 1.8 g/m$^2$ to about 2.7 g/m$^2$, and most preferably from about 2.0 g/m$^2$ to about 2.5 g/m$^2$. The coating is dried under conditions that will effectively remove all solvent, but no so aggressive as to cause some degradation of the acid generator or reaction of the polymers with themselves or with each other.

The following non-limiting examples illustrate the invention:

EXAMPLE 1

A coating solution was prepared by dissolving 6.6 g of BAKELITE® 744 novolak resin (a novolak resin sold by Bakelite), 13.4 g of HRJ 11482 resin (a polyhydric resin sold by Schenectady), 1.0 g of laser dye 830A (sold by ADS, Montreal, Canada), 1.6 g of diphenyliodonium hexafluorophosphate, and 0.4 g of naphthoic acid in 58 g of 1-methoxy-2-propanol and 19 g of methyl ethyl ketone. An aluminum substrate which has been degreased, electrochemically grained, anodized, and made hydrophilic with a polyvinyl phosphonic acid treatment, as is well known to one skilled in the art, was coated with the above composition. When properly dried, the plate was placed on a Creo Trendsetter image setter, imaging is done in the "write-the-image" mode using 200 mJ/cm$^2$ of energy at 830 nm. The plate was developed through a processing machine which was charged with IBF-PD positive developer. The developed plate was observed to have a very strong positive image with good resolution. Based upon an UGRA scale, the microlines were 8/10 and the halftone dot resolution was 2–98. Under standard printing conditions, the plate was observed to print about 20,000 good impressions.

EXAMPLE 2

Another plate was prepared as described in example 1 except that after imaging, and prior to development, the plate was given a heat treatment for one minute at 110° C. The plate was similarly developed in a positive developer. Again a positive image was observed. The image was observed to be more intense. The microline resolution was 4/6 and the halftone dot resolution was 0.5–99.5. Under standard printing conditions, the plate was observed to print about 70,000 good impressions.

EXAMPLE 3

Another plate was prepared exactly as described in example 2. After development, the plate was baked for five minutes at 230° C. Under standard printing conditions, the plate was observed to print about 20,000 good impressions.

EXAMPLE 4

A coating solution was prepared by dissolving 13.6 g of BAKELITE® 744 novolak resin (a novolak resin sold by Bakelite), 3.0 g of HRJ 11482 resin (a polyhydric resin sold by Schenectady), 2.4 g of carbon black, 0.6 g of 3-methoxy-4-diazodiphenylamine hexafluorophosphate, and 0.4 g of benzoic acid in 81.6 g of 1-methoxy-2-propanol and 20 g of methyl ethyl ketone. An aluminum substrate which has been degreased, electrochemically grained, anodized, and made hydrophilic with a polyvinyl phosphonic acid treatment, as is well known to one skilled in the art, is coated with the above composition. When properly dried, the plate was placed on a Creo Trendsetter image setter. Imaging was done in the "write-the-background" mode using 200 mJ/cm$^2$ of energy at 830 nm. The plate is developed through a processing machine which was charged with IBF-PD positive developer. The developed plate was observed to have a reverse image. The portion of the coating which was imaged is now the background. The image resolution was however very good. Based upon an UGRA scale, the microlines were 10/8 and the halftone dot resolution was 2–98. Under standard printing conditions, the plate was observed to print about 25,000 good impressions.

EXAMPLE 5

Another plate was prepared as described in example 4 except that after imaging, and prior to development, the plate was given a heat treatment for one minute at 110° C. The plate was similarly developed in a positive developer. This time a positive image was observed. Heating has caused the image to reverse. The image was observed to be more intense and have better resolution than the reversed counterpart. The microline resolution was 4/6 and the halftone dot resolution was 0.5–99. Under standard printing conditions, the plate was observed to print about 95,000 good impressions.

EXAMPLE 6

Another plate was prepared exactly as described in example 5. After development, the plate was baked for five minutes at 230° C. Under standard printing conditions, the plate was observed to print about 3,400,000 good impressions.

EXAMPLE 7

A coating solution was prepared by dissolving 17 g of BAKELITE® 744 novolak resin (a novolak resin sold by Bakelite), 3.8 g of HRJ 11482 resin (a polyhydric resin sold by Schenectady), 1.0 g of carbon black, and 0.8 g of 3-methoxy-4-diazo-2-diphenylamine hexafluorophosphate, and 58.6 g of 1-methoxy-2-propanol and 19.2 g of methyl ethyl ketone. An aluminum substrate which has been degreased, electrochemically grained, anodized, and made hydrophilic with a polyvinyl phosphonic acid treatment, as is well known to one skilled in the art, was coated with the above composition. When properly dried, the plate was placed on a Creo Trendsetter image setter and imaging was done in the "write-the-image" mode using 275 mJ/cm$^2$ of energy at 1064 nm. The plate was developed through a processing machine which was charged with IBF-PD positive developer. The developed plate was observed to have a very strong positive image with good resolution. Based upon an UGRA scale, the microlines were 6/10 and the halftone dot resolution was 1–98. Under standard printing conditions, the plate was observed to print about 23,000 good impressions.

EXAMPLE 8

Another plate was prepared as described in example 7 except that after imaging, and prior to development, the plate was given a heat treatment for one minute at 110° C. The plate was similarly developed in a positive developer. Again a positive image was observed. The image was observed to be more intense. The microline resolution was 4/6 and the halftone dot resolution was 0.5–99.5. Under standard printing conditions, the plate was observed to print about 85,000 good impressions.

EXAMPLE 9

Another plate was prepared exactly as described in example 8. After development, the plate was baked for five minutes at 230° C. Under standard printing conditions, the plate was observed to print about 2,350,000 good impressions.

EXAMPLE 10

A coating solution was prepared by dissolving 15.8 g of BAKELITE® 744 novolak resin (a novolak resin sold by Bakelite), 5.0 g of HRJ 11482 resin (a polyhydric resin sold by Schenectady), 1.6 g of carbon black, 0.2 g of laser dye 1060 A (manufactured and sold by ADS), and 0.6 g of diphenyliodonium hexafluorophosphate, in 81.6 g of 1-methoxy-2-propanol and 20 g of methyl ethyl ketone. An aluminum substrate which has been degreased, electrochemically grained, anodized, and made hydrophilic with a polyvinyl phosphonic acid treatment, as is well known to one skilled in the art, was coated with the above composition. When properly dried, the plate was placed on a Creo Trendsetter image setter. Imaging was done in the "write-the-background" mode using 275 mJ/cm$^2$ of energy at 1064 nm. The plate was developed through a processing machine which was charged with IBF-PD positive developer. The developed plate was observed to have a reverse image. The portion of the coating which was imaged is now the background. The image resolution was however very good. Based upon the UGRA scale, the microlines were 10/6 and the halftone dot resolution was 2–98. Under standard printing conditions, the plate was observed to print about 20,000 good impressions.

EXAMPLE 11

Another plate was prepared as described in example 10 except that after imaging, and prior to development, the plate was given a heat treatment for one minute at 110° C. The plate was similarly developed in a positive developer. This time a positive image was observed. Heating has caused the image to reverse. The image was observed to be more intense and have better resolution than the reversed counterpart. The microline resolution was 4/8 and the halftone dot resolution was 1–99. Under standard printing conditions, the plate was observed to print about 80,000 good impressions.

EXAMPLE 12

Another plate was prepared exactly as described in example 11. After development, the plate was baked for five minutes at 230° C. Under standard printing conditions, <the plate was observed to print about 2,800,000 good impressions.

What is claimed is:

1. A process for printing or image development, wherein said process comprises the use of a composition comprising: 1) a dual polymer binder system, 2) an infrared absorbing compound, 3) an acid generating compound and, optionally, 4) a stabilizing acid, for forming a coating upon a lithographic printing plate and developing an image from the plate coated with said composition, wherein said plate is subjected to cure after development, further wherein the composition is the only coating on said lithographic printing plate.

2. A process according to claim 1, wherein the composition comprises a dual polymer binder system comprises a first polymer comprised of a condensation product of phenol, o-chlorophenol, o-, m- or p-cresol, p-hydroxy benzoic acid, 2-naphthol or other monohydroxy aromatic monomer with a first aliphatic or aromatic aldehyde;

and a second polymer comprised of the condensation product of catechol, resorcinol, hydroquinone, bisphenol A, bisphenol B, trihydroxybenzene, or other di- or polyhydroxy aromatic compound, and methylolated analogs thereof, with a second aliphatic or aromatic aldehyde.

3. A process according to claim 2, wherein the first polymer has a molecular weight in the range from 2,000 to 80,000; and the second polymer has a molecular weight in the range from 150 to 15,000.

4. A process according to claim 1, wherein the infrared absorbing compound in said composition is a dye or insoluble material such as carbon black.

5. A process according to claim 4, wherein the infrared absorbing compound is comprised of dyes derived from classes including pyridyl, quinolinyl, benzoxazolyl, thiazolyl, benzothiazolyl, oxazolyl and selenazolyl.

6. A process according to claim 1, wherein the acid generating compound in said composition is an onium salt, wherein the onium salt has an anion.

7. A process according to claim 6, wherein the onium salt comprises sulfonium, sulfoxonium, arsonium, iodonium, diazonium, bromonium, selenonium and phosphonium.

8. A process according to claim 6, wherein the anion, which determines the released free acid, includes chloride, bisulfate, hexafluoroantimonate, hexafluorophosphate, tetrafluoroborate, methane sulfonate and mesitylene sulfonate.

9. A process according to claim 6, wherein the onium salt is diphenyliodonium hexafluorophosphate or 3-methoxy-4-diazodiphenylamine hexafluorophosphate.

10. A process according to claim 1, wherein the stabilizing acid in the composition is a carboxylic acid.

11. A process according to claim 10, wherein the stabilizing acid is an aromatic carboxylic acid.

12. A process according to claim 11, wherein the stabilizing acid is a benzoic acid or a substitute thereof or a naphthoic acid or a substitute thereof.

13. A process according to claim 1, wherein the composition is either in a write-the-background mode or in a write-the-image mode, wherein the write-the-background mode comprises the following formulation:
   dual polymer binder,
   * first polymer 50–95%
   * second polymer 5.0–40%
   infrared absorber 0.1–12%
   acid generator 0.1–10%
   stabilizing acid 0.1–10%,
   further wherein the write-the-image mode comprising the following formulation:
   Dual polymer binder,
   * first polymer 5–95%
   * second polymer 10–90%
   infrared absorber 0.1–12%
   acid generator 0.1%–15%
   stabilizing acid 0.1–10%.

14. A process according to claim 13, wherein the write-the-background mode has formulation 1A and the write-the-image mode has formulation 2A:
   1A. Write-the-background mode
   Dual polymer binder,
   * first polymer 50–90%
   * second polymer 5–35%
   infrared absorber 0.5–12%
   acid generator 0.5–12%
   stabilizing acid 0.1–10%
   2A. Write-the-image mode
   Dual polymer binder,
   * first polymer 5–90%
   * second polymer 40–90%
   infrared absorber 0.5–12%
   acid generator 1.0–15%
   stabilizing acid 0.1–10%.

15. A process for printing or image development, wherein said process comprises the use of a composition comprising: 1) a dual polymer binder system, 2) an infrared absorbing compound, 3) an acid generating compound and 4) a stabilizing acid, for forming a coating upon a lithographic printing plate and developing an image from the plate coated with said composition, wherein said plate is subjected to cure after development, further wherein said composition is the only coating on said lithographic printing plate.

* * * * *